(12) United States Patent
Cöster et al.

(10) Patent No.: US 9,655,050 B2
(45) Date of Patent: May 16, 2017

(54) NETWORK DEVICE, METHOD, COMPUTER PROGRAM AND COMPUTER PROGRAM PRODUCT FOR DETERMINING A SET OF POWER STATE PARAMETERS

(71) Applicant: Telefonaktiebolaget L M Ericsson (publ), Stockholm (SE)

(72) Inventors: Rickard Cöster, Hägersten (SE); Vincent Huang, Sollentuna (SE); Mona Matti, Nacka (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/441,878

(22) PCT Filed: Nov. 12, 2012

(86) PCT No.: PCT/SE2012/051232
§ 371 (c)(1),
(2) Date: May 11, 2015

(87) PCT Pub. No.: WO2014/074040
PCT Pub. Date: May 15, 2014

(65) Prior Publication Data
US 2015/0304952 A1    Oct. 22, 2015

(51) Int. Cl.
*H04W 52/02* (2009.01)
*H04W 76/04* (2009.01)

(52) U.S. Cl.
CPC ... *H04W 52/0235* (2013.01); *H04W 52/0216* (2013.01); *H04W 76/048* (2013.01); *Y02B 60/50* (2013.01)

(58) Field of Classification Search
None
See application file for complete search history.

(56) References Cited

U.S. PATENT DOCUMENTS

| 7,760,676 B2 * | 7/2010 | Demirhan | H04W 52/0216 |
| | | | 370/311 |
| 8,023,990 B2 * | 9/2011 | Parkvall | H04W 52/58 |
| | | | 370/311 |

(Continued)

OTHER PUBLICATIONS

Unknown, Author, "About DRX Configuration and UE Assistance", 3GPP TSG-RAN WG2 #78, R2-122587, Prague, Czech Republic, May 21-25, 2012, 7 pages.

(Continued)

*Primary Examiner* — Gregory Sefcheck
(74) *Attorney, Agent, or Firm* — Murphy, Bilak & Homiller, PLLC

(57) ABSTRACT

It is presented a method, performed by a network device, for determining a set of power state parameters at least partly defining when a wireless terminal is to be in an active state or a power saving state. The method comprises the steps of: obtaining traffic types for each one of a plurality of traffic flows to or from a wireless terminal, resulting in a present combination of traffic types; finding, in a power state parameter repository, a first match between the present combination of traffic types and a combination of traffic types associated with a first set of power state parameters; and when the first match is found, transmitting the first set of power state parameters to the wireless terminal. A corresponding network device, computer program and computer program product are also presented.

17 Claims, 3 Drawing Sheets

(56) References Cited

U.S. PATENT DOCUMENTS

| | | | | |
|---|---|---|---|---|
| 8,150,477 | B2* | 4/2012 | Cho | H04W 52/0216 370/318 |
| 8,229,416 | B2* | 7/2012 | Akman | H04W 24/06 455/419 |
| 8,374,097 | B2* | 2/2013 | Guiriec | G10L 19/012 370/252 |
| 8,654,691 | B2* | 2/2014 | Anderson | H04W 52/0232 370/310 |
| 8,792,423 | B2* | 7/2014 | Lu | 370/328 |
| 8,811,222 | B2* | 8/2014 | Pajukoski | H04B 17/24 370/252 |
| 8,849,215 | B2* | 9/2014 | Edara | H04W 36/0088 455/226.1 |
| 8,902,763 | B2* | 12/2014 | DiGirolamo | H04W 28/18 370/252 |
| 9,173,109 | B2* | 10/2015 | Xu | H04W 24/00 |
| 9,232,421 | B2* | 1/2016 | Wehmeier | H04W 52/0216 |
| 9,237,478 | B2* | 1/2016 | Vannithamby | H04W 24/02 |
| 9,295,095 | B2* | 3/2016 | Rayavarapu | H04W 76/046 |
| 9,369,960 | B2* | 6/2016 | Lee | H04W 52/0216 |
| 2007/0259673 | A1* | 11/2007 | Willars | H04W 52/0225 455/453 |
| 2011/0116427 | A1 | 5/2011 | Chang et al. | |
| 2012/0120815 | A1 | 5/2012 | Anderson et al. | |
| 2012/0120843 | A1* | 5/2012 | Anderson | H04W 52/0232 370/253 |
| 2012/0182916 | A1 | 7/2012 | Pelletier et al. | |
| 2012/0269143 | A1* | 10/2012 | Bertrand | H04W 72/1231 370/329 |
| 2015/0304949 | A1* | 10/2015 | Coster | H04W 52/0235 370/311 |
| 2015/0351151 | A1* | 12/2015 | Huang | H04W 36/0083 370/252 |

OTHER PUBLICATIONS

Unknown, Author, "Discussion on Management of Diverse Data Applications", 3GPP TSG-RAN2 #73bis meeting, R2-112037, Shanghai, PRC, Apr. 11-15, 2011, 3 pages.
Unknown, Author, "DRX Configuration and Management for LTE_Active", 3GPP TSG RAN WG2 #59, R2-073541, Athens, Greece, Aug. 20-24, 2007, 3 pages.

* cited by examiner

NETWORK DEVICE, METHOD, COMPUTER PROGRAM AND COMPUTER PROGRAM PRODUCT FOR DETERMINING A SET OF POWER STATE PARAMETERS

TECHNICAL FIELD

The invention relates to determining power state parameters for wireless terminals, the power state parameters at least partly defining when a wireless terminal is to be in an active state or a power saving state.

BACKGROUND

In cellular networks, wireless terminals are often battery powered. Hence power usage in wireless terminals is always under scrutiny and any reduction in power usage is beneficial for the end user and the society at large.

In order to save power in the wireless terminal, DRX (Discontinuous Reception) can be used. A DRX cycle consists of an ON duration and an OFF duration. No data can be received during the energy saving OFF duration. If data is received in downlink during the ON duration, or if data is sent via uplink at any time, the wireless terminal will enter an active state and start an inactivity timer.

DRX is configured per wireless terminal and is governed by a set of power state parameters. However, it is not evident how to set the power state parameters. On the one hand, it is desired to save power. But on the other hand, negative effects resulting from setting the wireless terminal in an inactive state, even temporarily, should be avoided if possible.

The current solutions to setting the power state parameters are based on selecting power state parameters based on service class (e.g. Voice over Internet Protocol (VoIP), video conversation, etc.). However, it would be greatly beneficial if the setting of power state parameters could be improved even further, to more closely reflect traffic usage in the wireless terminal.

SUMMARY

It is an object to improve how power state parameters are determined for operational traffic.

According to a first aspect, it is presented a method, performed by a network device, for determining a set of power state parameters at least partly defining when a wireless terminal is to be in an active state or a power saving state. The method comprises the steps of: obtaining traffic types for each one of a plurality of traffic flows to or from a wireless terminal, resulting in a present combination of traffic types; finding, in a power state parameter repository, a first match between the present combination of traffic types and a combination of traffic types associated with a first set of power state parameters; and when the first match is found, transmitting the first set of power state parameters to the wireless terminal. In quite a few cases, a user has a plurality of traffic flows at the same time, e.g. streaming audio and web traffic. By finding power state parameters based on a combination of traffic types, a set of power state parameters which is particularly suited for the combination can be used. This is a significant improvement from finding power state parameters based on a single traffic type.

The method may comprise the step of: when no first match is found, reading a configuration associated with the wireless terminal, the configuration specifying a prioritised single traffic type; when no first match is found, finding, in the power state parameter repository, a second match between the prioritised single traffic type and a single traffic type associated with a second set of power state parameters; and when the second match is found, transmitting the second set of power state parameters to the wireless terminal. There are a vast number of possible combinations of traffic types. It is realised that it may not be feasible to provide power state parameters for each and every possible combination. Hence, by using the prioritised traffic type, when there is not a set of power state parameters available for the present combination of traffic types, a set of power state parameters can be determined.

The method may comprise the step of: when the second match is found, updating the power state parameter repository with a performance of the second set of power state parameters, for the present combination of traffic types. It may be the case that the second set of power state parameters, which was originally for the single traffic type, proves to work well for the present combination of traffic types. Using this performance information, the second set of power state parameters could be used a next time when the present combination of traffic types is encountered.

The method may comprise the step of: combining queues for the plurality of traffic flows in a combined queue, taking into account priority parameters respectively associated with the plurality of traffic flows.

The method may comprise the steps, prior to the step of obtaining traffic types, of: simulating, for a combination of a plurality of traffic flows, a plurality of sets of power state parameters on the combination of a plurality traffic flows, wherein, for each set of power state parameters, a cost is evaluated; storing the result of the simulating in the power state repository; and repeating the steps of simulating and storing for a plurality of combinations, each combination relating to a plurality of traffic flows. This simulation can e.g. be performed in off-line, prior to performing the rest of the method. In this way, the power state repository can be populated in advance for one or more combinations of traffic flows.

In the step of simulating, the cost may be evaluated such that the cost is lower for lower power usage in the wireless terminal with maintained packet delay.

In the step of simulating, the cost may be evaluated such that the cost is lower for lower resource usage in a network device with maintained packet delay.

Each set of power state parameters may comprise at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

The traffic types may be selected from the group consisting of: voice over Internet Protocol, video conference, video streaming, audio streaming, web browsing, peer-to-peer traffic, media downloads, and software downloads. The traffic types could equally well be of any other traffic type than those explicitly listed.

The step of obtaining traffic types may comprise using packet inspection to determine a traffic type for each one of the plurality of traffic flows.

According to a second aspect, it is presented a network device arranged to determine a set of power state parameters at least partly defining when a wireless terminal is to be in an active state or a power saving state. The network device comprises: a processor; and a computer program product storing instructions that, when executed by the processor, causes the network device to: obtain traffic types for each one of a plurality of traffic flows to or from a wireless terminal, resulting in a present combination of traffic types; find, in a power state parameter repository, a first match between the present combination of traffic types and a combination of traffic types associated with a first set of power state parameters; and when the first match is found, transmit the first set of power state parameters to the wireless terminal.

The instructions may comprise instructions to: when no first match is found, read a configuration associated with the wireless terminal, the configuration specifying a prioritised single traffic type; when no first match is found, find, in the power state parameter repository, a second match between the prioritised single traffic type and a single traffic type associated with a second set of power state parameters; and when the second match is found, transmit the second set of power state parameters to the wireless terminal.

The instructions may comprise instructions to: when the second match is found, update the power state parameter repository with a performance of the second set of power state parameters, for the present combination of traffic types.

The instructions may comprise instructions to: combine queues for the plurality of traffic flows in a combined queue, taking into account priority parameters respectively associated with the plurality of traffic flows.

The instructions may comprise instructions, prior to the instructions to obtain traffic types, to: simulate, for a combination of a plurality of traffic flows, a plurality of sets of power state parameters on the combination of a plurality traffic flows, wherein, for each set of power state parameters, a cost is evaluated; store the result of the simulating in the power state repository; and repeat the steps of simulating and storing for a plurality of combinations, each combination relating to a plurality of traffic flows.

The instructions to simulate may comprise instructions to evaluate the cost such that the cost is lower for lower power usage in the wireless terminal with maintained packet delay.

The instructions to simulate may comprise instructions to evaluate the cost such that the cost is lower for lower resource usage in a network device with maintained packet delay.

Each set of power state parameters may comprise at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

The traffic types may be selected from the group consisting of: voice over Internet Protocol, video conference, video streaming, audio streaming, web browsing, peer-to-peer traffic, media downloads, and software downloads.

The instructions to obtain traffic types may comprise instructions to use packet inspection to determine a traffic type for each one of the plurality of traffic flows.

According to a third aspect, it is presented a computer program for determining a set of power state parameters at least partly defining when a wireless terminal is to be in an active state or a power saving state. The computer program comprises computer program code which, when run on a network device, causes the network device to: obtain traffic types for each one of a plurality of traffic flows to or from a wireless terminal, resulting in a present combination of traffic types; find, in a power state parameter repository, a first match between the present combination of traffic types and a combination of traffic types associated with a first set of power state parameters; and when the first match is found, transmit the first set of power state parameters to the wireless terminal.

According to a fourth aspect, it is presented a computer program product comprising a computer program according to the third aspect and a computer readable means on which the computer program is stored.

According to a fifth aspect, it is presented a network device arranged to determine a set of power state parameters at least partly defining when a wireless terminal is to be in an active state or a power saving state. The network device comprises: means for obtaining traffic types for each one of a plurality of traffic flows to or from a wireless terminal, resulting in a present combination of traffic types; means for finding, in a power state parameter repository, a first match between the present combination of traffic types and a combination of traffic types associated with a first set of power state parameters; and means for transmitting the first set of power state parameters to the wireless terminal when the first match is found.

The network device may comprise: means for reading a configuration associated with the wireless terminal when no first match is found, the configuration specifying a prioritised single traffic type; when no first match is found, finding, in the power state parameter repository, a second match between the prioritised single traffic type and a single traffic type associated with a second set of power state parameters; and when the second match is found, transmitting the second set of power state parameters to the wireless terminal.

The network device may comprise means for when the second match is found, updating the power state parameter repository with a performance of the second set of power state parameters, for the present combination of traffic types.

The network device may comprise means for combining queues for the plurality of traffic flows in a combined queue, taking into account priority parameters respectively associated with the plurality of traffic flows.

The network device may comprise means for simulating, for a combination of a plurality of traffic flows, a plurality of sets of power state parameters on the combination of a plurality traffic flows, wherein, for each set of power state parameters, a cost is evaluated; means for storing the result of the simulating in the power state repository; and means for repeating the simulating and storing for a plurality of combinations, each combination relating to a plurality of traffic flows.

The cost may be evaluated such that the cost is lower for lower power usage in the wireless terminal with maintained packet delay.

The cost may be evaluated such that the cost is lower for lower resource usage in a network device with maintained packet delay.

Each set of power state parameters may comprise at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

The traffic types may be selected from the group consisting of: voice over Internet Protocol, video conference, video streaming, audio streaming, web browsing, peer-to-peer traffic, media downloads, and software downloads.

The means for obtaining traffic types may comprise means for using packet inspection to determine a traffic type for each one of the plurality of traffic flows.

It is to be noted that any feature of the first, second, third, fourth and fifth aspects may, where appropriate, be applied to any other of these aspects.

Generally, all terms used in the claims are to be interpreted according to their ordinary meaning in the technical field, unless explicitly defined otherwise herein. All references to "a/an/the element, apparatus, component, means, unit, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
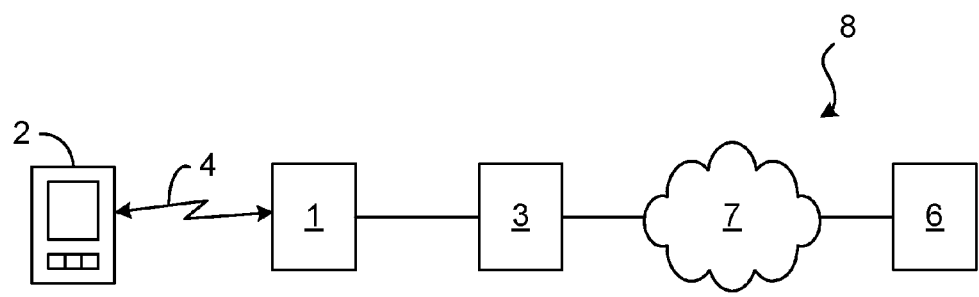
FIG. 1 is a schematic diagram illustrating an environment where embodiments presented herein can be applied.

FIG. 1 is a schematic diagram illustrating a cellular network 8 where embodiments presented herein may be applied. The cellular network 8 comprises a core network 3 and one or more radio base stations 1, here in the form of evolved Node Bs, also known as eNode Bs or eNBs. The radio base stations 1 could also be in the form of Node Bs, BTSs (Base Transceiver Stations) and/or BSSs (Base Station Subsystems), etc. The radio base stations 1 provide radio connectivity to a plurality of wireless terminals 2. The term wireless terminal is also known as mobile communication terminal, user equipment, mobile terminal, user terminal, user agent, machine-to-machine devices etc., and can be, for example, what today are commonly known as a mobile phone or a tablet/laptop with wireless connectivity or fixed mounted terminal. Moreover, the wireless terminals 2 may but do not need to, be associated with a particular end user.

The cellular network 8 may e.g. comply with any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink communication (from the wireless terminal) and downlink communication (to the wireless terminal) between each wireless terminal 2 and the radio base station 1 occur over a wireless radio interface 4. The quality of the wireless radio interface 4 to each wireless terminal 2 can vary over time and depending on the position of the wireless terminal 2, due to effects such as fading, multipath propagation, etc.

The radio base stations 1 are also connected to the core network 3 for connectivity to central functions and a wide area network 7, such as the Internet. One or more content/application servers 6 are also connected to the wide area network 7. In this way, the wireless terminal 2 can request content, such as video, audio, images, text, etc., from the content servers 6. When appropriate, such as for video and/or audio, the content can be delivered in a traffic flow using a suitable protocol, e.g. HTTP (Hypertext transfer protocol), RTP (Real-time Transport Protocol) or application specific protocols on TCP (Transmission Control Protocol) or UDP (User Datagram Protocol).

Figure 2:
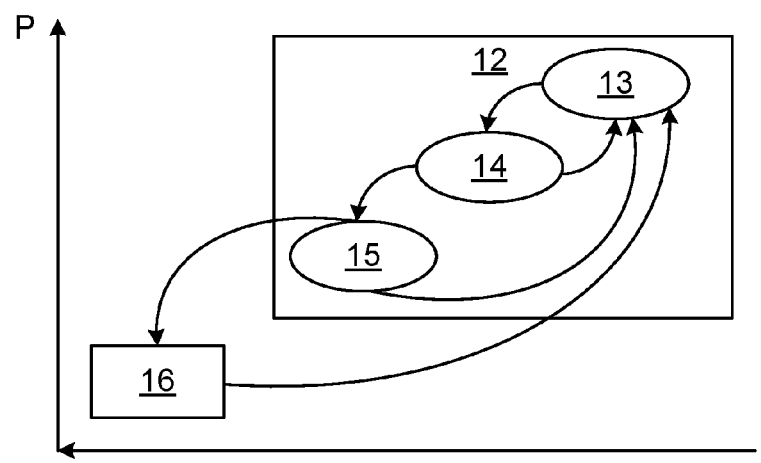
FIG. 2 is a state diagram illustrating various power states for a wireless terminal of FIG. 1.

FIG. 2 is a state diagram illustrating various power states for a wireless terminal of FIG. 1. Each state uses an average power and involves an average latency for communication. In the diagram of FIG. 2, states further to the left involve a greater latency and states further up involve greater average power usage for the wireless terminal in question.

The states are used for Discontinuous Reception (DRX), which is a feature provided in LTE/E-UTRAN (Evolved UMTS Terrestrial Radio Access Network) for power saving in the wireless terminal, reducing battery consumption. A DRX cycle consists of an ON period of an ON duration and an OFF period of an OFF duration. No data can be received during the energy saving OFF duration. If data is received in downlink during the ON duration, or if data is sent via uplink, the wireless terminal will stay awake and start an inactivity timer.

There are two main states shown in FIG. 2, an RRC_IDLE state 16 and an RRC_CONNECTED state 12. In DRX, the RRC_CONNECTED state 12 comprises three individual states: a long DRX state 15, a short DRX state 14 and an active state 13. The active state 13 is above the other states 14, 15, 16 in the diagram of FIG. 2, thereby using more power. Hence, the short DRX state 14, the long DRX state and the RRC_IDLE state 16 are throughout this description and claims known as power saving states. In other words, the power saving states 14, 15, 16 all use less power on average than the active state 13.

When in one of the long and short DRX states 14-15, the wireless terminal does not constantly monitor the PDCCH (Physical Downlink Control Channel) every TTI (Transmission Time Interval), but only during specific time intervals. During these non-active states 14-15, the wireless terminal can go into power saving OFF period for part of the time that decreases the power consumption.

Hence, two DRX cycles can be set for each wireless terminal: a short DRX cycle and a long DRX cycle for the short DRX state 14 and the long DRX state 15, respectively. When the wireless terminal is in the active state 13, a first inactivity timer is started after a downlink packet is received. When the first inactivity timer expires, the wireless terminal switches to the short DRX state 14. In the short DRX state 14, the wireless terminal can only receive packets during the ON duration.

If a packet is received while in the short DRX state 14, the wireless terminal returns to the active state 13. Otherwise, a short DRX cycle Timer is started. When the short DRX cycle Timer expires, the wireless terminal switches to the long DRX state 15. In the long DRX state, the wireless terminal can switch to the RRC_IDLE state 16 when a third inactivity timer expires. If a data packet is received during the ON Duration of the long DRX state 15, the wireless terminal returns to the active state 13 directly, without passing via the short DRX state 14. Uplink data packets always trigger the wireless terminal switching to the active state 13, if not already there.

From the RRC_IDLE state 16, a random access procedure is required to get the wireless terminal back to the RRC_CONNECTED state 12 in general, and the active state 13 in particular.

There are a number of power state parameters that can be configured in the DRX state, such as On Duration, the first inactivity timer, the short DRX cycle timer, the long DRX cycle timer, the duration of the short DRX cycle, the duration of the long DRX cycle, retransmission timer, start offset, etc. These power state parameters can be configured for each wireless terminal separately and thus at least partly define when the wireless terminal is to be in an active state or one of the power saving states 14, 15, 16. The retransmission timer parameter specifies the maximum number of consecutive PDCCH (Physical Downlink Control Channel) subframes the wireless terminal should remain active to be ready to receive an incoming retransmission after the first available retransmission time. The start offset parameter is an offset for each wireless terminal so that, in the time domain, not all wireless terminals start receiving at the same time.

Figure 3:
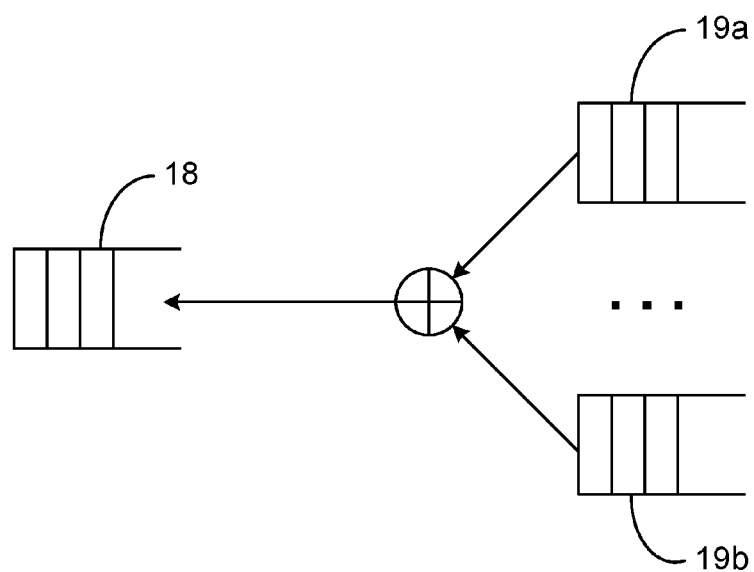
FIG. 3 is a schematic diagram illustrating how queues are combined in a network device of FIG. 5.

FIG. 3 is a schematic diagram illustrating how queues are combined in a network device in the downlink towards a wireless terminal such as the wireless terminal 2 of FIG. 1. There is a first input queue 19a for a first traffic type and a second input queue 19b for the second traffic type. The first and second input queues 19a-b are combined into a single output queue 18. It is to be noted that, while only two input queues are shown in FIG. 3, any number of input queues can be combined to the single output queue 18.

The decision as to which one of the first or second queues 19a-b is to be the source for the next packet of the common queue 18 is based on packet priorities of the next packet in line of all the input queues 19a-b.

In one embodiment, the packet priority is calculated according to:

$$P_i = D_i - t_i \quad [1]$$

where $P_i$ represents packet priority and $t_i$ represents the waiting time in the respective component queue of traffic flow i. $P_i$ is here defined such that for a higher priority, $P_i$ assumes a smaller value. $D_i$ represents a delay requirement of a particular traffic type, and can e.g. be obtained via a mapping of delay requirements per traffic type. For example, a first service may have a delay requirement of an average delay of 15 ms per packet, whereas a second service has delay requirement of an average delay of 50 ms per packet. Delay requirement is perhaps best determined by traffic type.

In another embodiment, the packet priority is calculated according to:

$$P_i = \frac{D_i - t_i}{D_i} \quad [2]$$

In this embodiment, the priority is calculated in relation to the delay requirement to get a relative priority calculation.

The priority calculation according to the first formula [1] calculates an absolute time left and the priority calculation according to the second formula [2] calculates a relative time left. The absolute calculation can e.g. be used when service quality is not affected as long as the packet is transmitted before the deadline. In a situation when the quality is affected depending how close to the deadline the packet transmission is, then the relative calculation is beneficial, providing a more fair distribution between traffic types with different delay requirements.

Figure 4A:
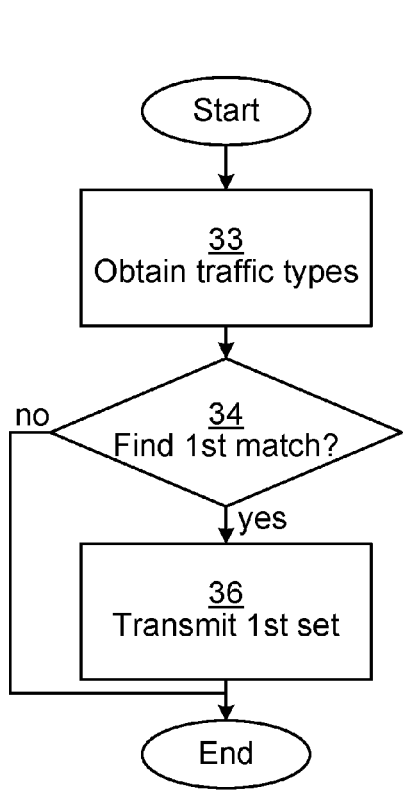
FIGS. 4A-B are flow charts illustrating methods performed in a network device of FIG. 5.
Figure 4B:
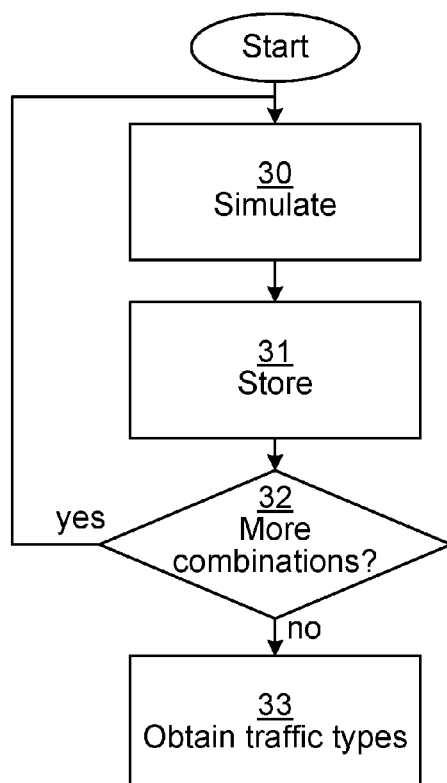
Figure 4B:
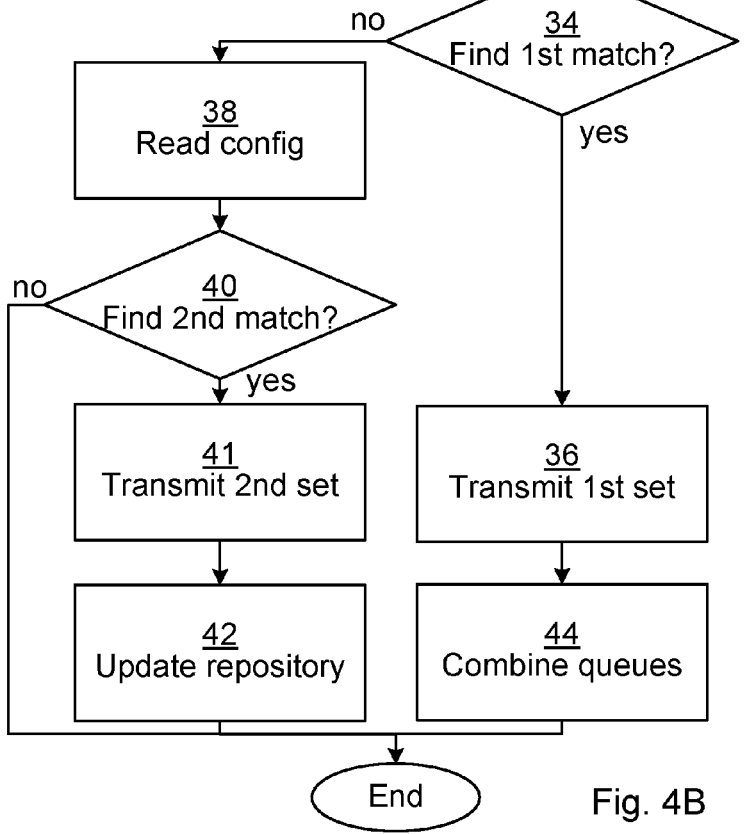

FIGS. 4A-B are flow charts illustrating methods performed in a network device (see FIGS. 5 and 6A-D below). The method determines a set of power state parameters at least partly defining when a wireless terminal is to be in an active state or a power saving state.

As mentioned above, the power state parameters can include On Duration, the first inactivity timer, the short DRX cycle timer, the long DRX cycle timer, the duration of the short DRX cycle, the duration of the long DRX cycle, retransmission timer, start offset, etc.

In one embodiment, all of these power state parameters are determined. In another embodiment, a subset of these parameters are determined by these methods, such as the short DRX cycle timer, first inactivity timer, the duration of the short DRX cycle, but not parameters related to the DRX long cycle.

The methods relate to the concept of traffic types. Traffic type is here to be construed as any relevant categorisation of the type of traffic. This can be on a service level, such as: voice over Internet Protocol (VoIP), video conference, video streaming, audio streaming, web browsing, peer-to-peer traffic, media downloads, and software downloads. Alternatively or additionally, the traffic type can be categorised on a more detailed level such as particular service, e.g. YouTube, Netflix, Facebook, etc. Alternatively or additionally, the traffic type can be categorised on a specific application, such as Windows Media Player, Google Earth, Spotify, etc. The categorisation into traffic types can be based on a previous categorisation performed at an earlier stage (and thus associated with the traffic flow). Alternatively or additionally, the categorisation into traffic types can be performed using packet inspection. The packet inspection can be performed in the network device or any other node between the content source and the network device.

Packet inspection can e.g. involve shallow packet inspection, Deep Packet Inspection (DPI) and/or heuristic inspection. Shallow packet inspection identifies services based on IP header information such as IP addresses, ports and transmission protocol. Deep packet inspection performs state dependent analysis of the protocol, to identify application specific information such as content URLs or application events. Heuristic inspection inspects the traffic based on empirical data about the traffic properties, such as patterns characteristic of a particular protocol or application.

The classification into traffic type can then e.g. use the packet context and state dependent flow analysis information obtained during the inspection phase to classify the packet into the right traffic type according to classification rules.

Now, the method illustrated by the flow chart in FIG. 4A will be described.

In an initial obtain traffic types step, traffic types for each one of a plurality of traffic flows to or from a wireless terminal are obtained. This results in a present combination of traffic types. The traffic types can relate to downlink and/or uplink data. The traffic flows are analysed and measurements are obtained. Optionally, one or more other traffic characterisation parameters, other than the traffic types, can be used, such as, packet inter arrival times, packet rate, burst length and burst size. Packet rate indicates the rate at which packets are received. Burst length indicates a duration of a burst and burst size indicates the number of packets of a burst. A burst can be defined as a set of packets where the inter arrival time is less than a particular threshold.

As described above, the traffic types can be obtained using deep packet inspection to determine a traffic type for each one of the plurality of traffic flows. Alternatively or additionally, as described above, the traffic type can be obtained using a previous traffic type determination, which is associated with the traffic flow in question and communicated to the network device.

In a conditional find first match step 34, it is determined whether a match is found, in a power state parameter repository, between the present combination of traffic types and a combination of traffic types associated with a first set of power state parameters. The power state parameter repository allows a set of power state parameters to be found using a combination of traffic types. Typically, there are several different sets of parameters for different sets of traffic types. As is explained in more detail below, the power state parameter repository can e.g. be populated using simulation.

The matching can be performed by finding a matching service combination in a database, e.g. in a database table.

In one embodiment, the matching is done by searching for a matching service combination. For example, if traffic types A, B, C are used, a set of power state parameters that correspond to this combination is looked for. This can e.g. be effected using one or more lookup tables and/or hash tables, storing either the best known set of power state parameters or a list of the best known set of power state parameters e.g. ranked according to usage frequency.

In one embodiment, the usage duration of the individual traffic types is included in the combination. For example, combination of service types (where the percentages indicate the relative usage duration of traffic types) A 25%, B 10%, C 65% could result in a first set of power state parameters, whereas A 40%, B 40%, C 20% could result in a second set of power state parameters. Finding this combination can be done by finding a closest match from the query combination of the stored combinations, where the goal is to minimize an overall difference between the search combination and the stored combinations, such as the square root of sum of squared differences (Euclidean distance).

In one embodiment, the traffic characteristics of each traffic type are also included as part of the key used in the matching. The traffic characteristics could e.g. comprise one or more of packet inter arrival times, packet rate, burst length and burst size, etc. The matching would then take into account one or both of the preceding matching embodiments, and also a similarity in traffic characteristics. For example, the duration requirements could be relaxed, to return a larger number of candidates for selecting the set of power state parameters. From the candidates, a combined matching score is calculated by also matching the traffic characteristics. Traffic characteristics could e.g. be matched using Euclidean distance.

When a match is found, the method proceeds to a transmit first set step 36. Otherwise, the method ends.

In the transmit first set step 36, the first set of power state parameters are transmitted to the wireless terminal. In this way, the wireless terminal is updated with the power state parameters that have been found.

When the power state parameters are transmitted to the wireless terminal, messages such as RRC CONNECTION RECONFIGURATION or RRC CONNECTION SETUP can be used to transmit the power state parameters.

Optionally, the applicable set of power state parameters are sent to the wireless terminal only when the first set of power state parameters differ more than a threshold amount from a currently active set of power state parameters of the wireless terminal in operation. In other words, optionally, there needs to be a significant change in power state parameters for it to be valuable to send the new set of power state parameters.

Optionally, the applicable set of power state parameters are sent to the wireless terminal only when the first set of power state parameters differs from a currently active set of power state parameters of the wireless terminal in operation for more than a threshold duration. In other words, optionally, there needs to be a change in power state parameters for a significant duration for it to be valuable to send the new set of power state parameters.

Now, the method illustrated by the flow chart of FIG. 4B will be described. The steps of the method illustrated in FIG. 4A have corresponding steps in this method and will not be described again, unless they are modified in some way in this method.

Prior to the obtain traffic types step 33, there are here three optional steps.

In a simulate step 30, a plurality of sets of power state parameters are simulated for a combination of a plurality of traffic flows. For each set of power state parameters, a cost is evaluated.

In one embodiment, once all sets of power state parameters have been simulated for a combination of traffic flows, an optimal set of power parameters are determined to be the set of parameters which has the lowest cost. By performing this step, the cost can be evaluated for a great number of sets of power parameters, increasing the chance of finding a set of power parameters which improves performance dramatically compared to default configuration of DRX.

In one embodiment, the cost is evaluated such that the cost is lower for lower power usage in the wireless terminal with maintained packet delay. The packet delay here needs to be calculated for the combined traffic flow, whereby the following formula can be used:

$$D = \frac{\sum n_i D_i}{\sum n_i} \quad [3]$$

where D is the combined delay. $D_i$ is the average delay requirement and $n_i$ is the number of packets, both for a particular traffic flow i.

We have several traffic flows where each traffic flow (represented by i) can have different number of packets Pi and also possibly different required delays Di, the formula combines the individual delays to a combined delay.

In an illustrative example, assume two traffic flows 1 and 2, where $n_1=10$, $D_1=15$ ms, $n_2=20$, $D_2=10$ ms. The combined delay D is then calculated according to the following using formula [3]:

$$D = (n_1 * D_1 + n_2 * D_2)/(n_1 + n_2)$$

$$= (10 * 15 + 20 * 10)/(10 + 20)$$

$$= 350/30 \sim$$

$$11, 66$$

In one embodiment, the cost is evaluated such that the cost is lower for lower resource usage in the network device with maintained packet delay. The packet delay for the combined traffic flow is calculated as explained above.

In a store step 31, the result of the simulating is stored in the power state parameter repository (52 of FIG. 5 below). In one embodiment, one entity is stored for each combination of traffic flows. Such an entity can be a set of power state parameters or a model of power state parameters which can be tailored even further to particular circumstances when applied.

In a conditional more combinations step 32, it is determined whether there are more combinations of traffic type parameters for which simulation is to be performed. When there are more combinations to simulate for, the method returns to the simulate step 30 for a new combination of traffic types. Since we are here considering a combination of traffic types, the number of possible combinations is great. Hence statistics of simultaneous traffic types from actual traffic can be used to determine only a certain number of most common combinations.

In the method illustrated in FIG. 4B, when no match is found in the conditional find first match step 34, the method proceeds to a read configuration step 38. In the read configuration step 38, a configuration associated with the wireless terminal is read from a configuration repository. The configuration repository can be a memory located in the network device, such as in the data memory 59 (FIG. 5 below). Alternatively or additionally, the configuration repository is centrally located, such as in a node of the core network 3 (FIG. 1). This configuration specifies a prioritised single traffic type. If the single traffic type is present in the present combination of traffic types, this single traffic type can be used below as a basis for finding a set of power state parameters. This configuration can e.g. be under the control of the operator and/or by the end user of the wireless terminal. For example, a set of power state parameters which have been found to be beneficial for a single traffic type can in fact be beneficial for a combination of traffic flows which comprises the single traffic type. In one embodiment, a set of power state parameters is obtained for a combination of traffic types which is similar, but not identical to, the present combination of traffic types.

In a conditional find second match step 40, it is determined whether a second match is found, in the power state parameter repository, between the prioritised single traffic type and a single traffic type associated with a second set of power state parameters. When a second match is found, the method proceeds to a transmit second set step 41. Otherwise, the method ends.

In the transmit second set step 41, the second set of power state parameters are transmit to the wireless terminal. The power state parameters are transmitted in the same way as described for the transmit first set step 36 above.

In an update repository step 42, the power state parameter repository is updated with a performance of the second set of power state parameters, for the present combination of traffic types. In particular, if it is found that, using the set of power state parameters for another traffic combination (e.g. including the single traffic type), the set of power state parameters are beneficial for the present combination of power state parameters, the power state parameter repository is updated such that when the present combination of power state parameters are found again, the current set of power state parameters can be used. The performance can be e.g. a number indicating battery saving achieved with the set of power state parameters, relative to default settings.

Furthermore, after the transmit first set step 36, there is here an optional combine queues step 44. In the combine queues step 44, queues for the plurality of traffic flows are combined in a combined queue. This combining takes into account priority parameters respectively associated with the plurality of traffic flows. Alternatively or additionally, packet arrival time and service delay requirements are taken into account in the combining.

Figure 5:
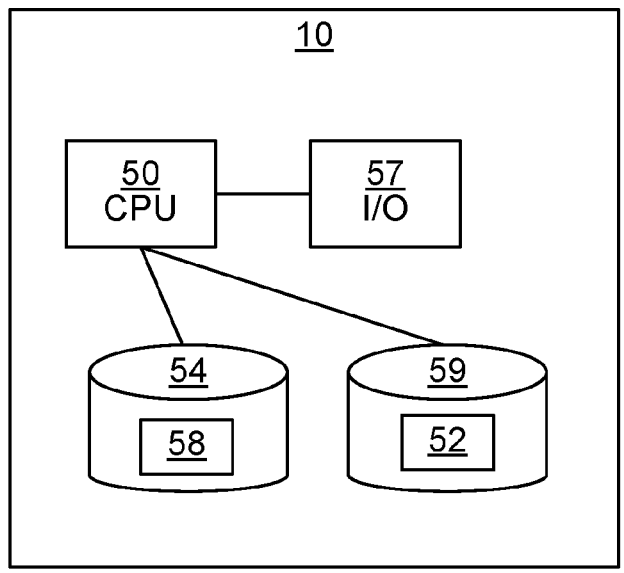
FIG. 5 is a schematic diagram illustrating some components of the network device.

FIG. 5 is a schematic diagram showing some components of the network device 10 arranged to execute the methods of FIGS. 4A-B. The components shown here can be components used from a host device containing the network device 10, or components for the network device 10, separate from the host device. A processor 50 is provided using any combination of one or more of a suitable central processing unit (CPU), multiprocessor, integrated circuit etc., capable of executing software instructions contained in a computer program 58 stored in a computer program product 54, e.g. in the form of a memory, but not in the form of a signal or any form of electromagnetic wave. The processor 50 can be configured to execute the method described with reference to FIGS. 4A-B above.

The computer program product 54 is here a memory being any combination of read and write memory (RAM) and read only memory (ROM). The memory also comprises persistent storage, which, for example, can be any single one or combination of magnetic memory, optical memory, solid state memory or even remotely mounted memory. The processor 50 controls the general operation of the network device 10.

The network device 10 further comprises a data memory 59, which is a read-and-write memory. The data memory 59 may also comprises persistent storage, which, for example, can be any single one or combination of magnetic memory, optical memory, solid state memory or even remotely mounted memory. The data memory 59 comprises a power state parameter repository 52, comprising one or more sets of power state parameters which are applicable for a combination of traffic types. Optionally, the computer program product 54 and the data memory 59 can form part of the same memory device.

The network device 10 further comprises an I/O interface 57 for communicating with external entities, e.g. to be able to capture traffic flows. Other components of the network device 10 are omitted in order not to obscure the concepts presented herein.

FIGS. 6A-D are schematic diagram illustrating various locations where the network device of FIG. 5 can be implemented. The network device 10 determines a set of power state parameters for one or more wireless terminals, using traffic flows. Hence, the network device can be located in, or in conjunction to, any host device anywhere along the path between the end wireless terminal 2 and the content server 6 (FIG. 1).

Figure 6A:
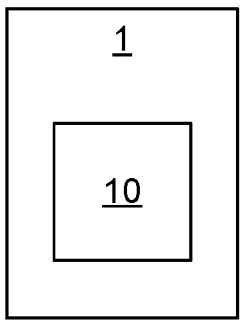
FIGS. 6A-D are schematic diagram illustrating various locations where the network device of FIG. 5 can be implemented.

In FIG. 6A, an embodiment is shown where the network device 10 is located in the radio base station 1.

Figure 6B:
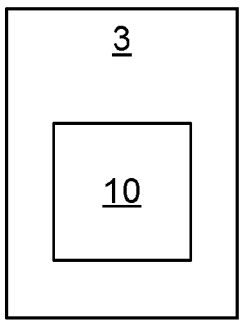

In FIG. 6B, an embodiment is shown where the network device 10 is located in the core network, 3, such as in or by an SGSN (Serving GPRS (General Packet Radio Service) Support Node), a GGSN (Gateway GPRS Support Node), a Serving Gateway, or a Packet Data Network Gateway.

Figure 6C:
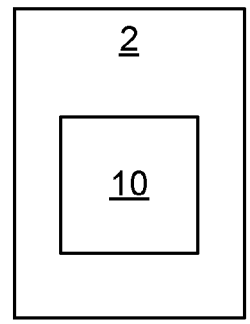
Figure 6D:
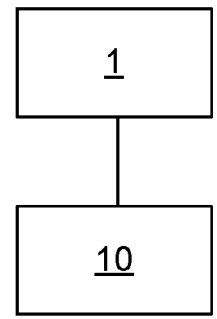

In FIG. 6C, an embodiment is shown where the network device 10 is located in the wireless terminal 2. In FIG. 6D, an embodiment is shown where the network device 10 is located with direct communication with the radio base station 1.

Optionally, different network devices 10 or different parts of the network device 10 can be housed in multiple devices.

Figure 7:
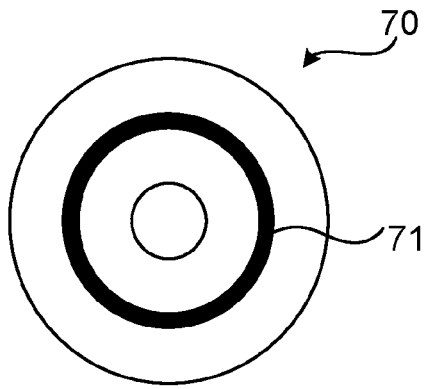
FIG. 7 shows one example of a computer program product comprising computer readable means.

FIG. 7 shows one example of a computer program product 70 comprising computer readable means. On this computer readable means a computer program 71 can be stored, which computer program can cause a controller to execute a method according to embodiments described herein. In this example, the computer program product is an optical disc, such as a CD (compact disc) or a DVD (digital versatile disc) or a Blu-Ray disc. As explained above, the computer program product could also be embodied as a memory of a device, such as the computer program product 54 of FIG. 5. While the computer program 71 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed by a network device, for determining a set of power state parameters at least partly defining when a wireless terminal is to be in an active state or a power saving state, the method comprising the steps of:
   obtaining traffic types for each one of a plurality of traffic flows to or from the wireless terminal, resulting in a present combination of traffic types selected from a group consisting of voice over Internet Protocol, video conference, video streaming, audio streaming, web browsing, peer-to-peer traffic, media downloads and software downloads;
   finding, in a power state parameter repository, a first match between the present combination of traffic types and a combination of traffic types associated with a first set of power state parameters, the power state repository comprising different sets of power state parameters, including the first set, where the different sets correspond to different combinations of traffic types;
   when the first match is found, transmitting the first set of power state parameters to the wireless terminal;
   when no first match is found, reading a configuration associated with the wireless terminal, the configuration specifying a prioritized single traffic type;
   when no first match is found, finding, in the power state parameter repository, a second match between the prioritized single traffic type and a single traffic type associated with a second set of power state parameters; and
   when the second match is found, transmitting the second set of power state parameters to the wireless terminal.

2. The method according to claim 1, comprising the step of:
   when the second match is found, updating the power state parameter repository with performance information for the second set of power state parameters, for the present combination of traffic types.

3. The method according to claim 1, comprising the step of:
   combining queues for the plurality of traffic flows in a combined queue, taking into account priority parameters respectively associated with the plurality of traffic flows.

4. The method according to claim 1, comprising the steps, prior to the step of obtaining traffic types, of:
   simulating, for a combination of a plurality of traffic flows, a plurality of sets of power state parameters on the combination of a plurality traffic flows, wherein, for each set of power state parameters, a cost is evaluated;
   storing the result of the simulating in the power state repository; and
   repeating the steps of simulating and storing for a plurality of combinations, each combination relating to a plurality of traffic flows.

5. The method according to claim 4, wherein in the step of simulating, the cost is evaluated such that the cost is lower for lower power usage in the wireless terminal with maintained packet delay.

6. The method according to claim 4, wherein in the step of simulating, the cost is evaluated such that the cost is lower for lower resource usage in a network device with maintained packet delay.

7. The method according to claim 4, wherein each set of power state parameters comprises at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

8. The method according to claim 1, wherein the step of obtaining traffic types comprises using packet inspection to determine a traffic type for each one of the plurality of traffic flows.

9. A network device arranged to determine a set of power state parameters at least partly defining when a wireless terminal is to be in an active state or a power saving state, the network device comprising:
   a processor; and
   a computer program product storing instructions that, when executed by the processor, causes the network device to:
      obtain traffic types for each one of a plurality of traffic flows to or from a wireless terminal, resulting in a present combination of traffic types selected from a group consisting of voice over Internet Protocol, video conference, video streaming, audio streaming, web browsing, peer-to-peer traffic, media downloads and software downloads;
      find, in a power state parameter repository, a first match between the present combination of traffic types and a combination of traffic types associated with a first set of power state parameters, the power state repository comprising different sets of power state parameters, including the first set, where the different sets correspond to different combinations of traffic types;
      when the first match is found, transmit the first set of power state parameters to the wireless terminal;
      when no first match is found, read a configuration associated with the wireless terminal, the configuration specifying a prioritized single traffic type;
      when no first match is found, find, in the power state parameter repository, a second match between the prioritized single traffic type and a single traffic type associated with a second set of power state parameters; and
      when the second match is found, transmit the second set of power state parameters to the wireless terminal.

10. The network device according to claim 9, wherein the instructions comprise instructions to:
    when the second match is found, update the power state parameter repository with performance information for the second set of power state parameters, for the present combination of traffic types.

11. The network device according to claim 9, wherein the instructions comprise instructions to:
- combine queues for the plurality of traffic flows in a combined queue, taking into account priority parameters respectively associated with the plurality of traffic flows.

12. The network device according to claim 9, wherein the instructions comprise instructions, prior to the instructions to obtain traffic types, to:
- simulate, for a combination of a plurality of traffic flows, a plurality of sets of power state parameters on the combination of a plurality of traffic flows, wherein, for each set of power state parameters, a cost is evaluated;
- store the result of the simulating in the power state repository; and
- repeat the steps of simulating and storing for a plurality of combinations, each combination relating to a plurality of traffic flows.

13. The network device according to claim 12, wherein the instructions to simulate comprise instructions to evaluate the cost such that the cost is lower for lower power usage in the wireless terminal with maintained packet delay.

14. The network device according to claim 12, wherein the instructions to simulate comprise instructions to evaluate the cost such that the cost is lower for lower resource usage in a network device with maintained packet delay.

15. The network device according to claim 12, wherein each set of power state parameters comprises at least one parameter, related to discontinuous reception, DRX, selected from the group consisting of: start offset, duration of long DRX Cycle, long DRX cycle timer, On duration, inactivity timer, duration of short DRX cycle, short DRX cycle timer, and retransmission timer.

16. The network device according to claim 9, wherein the instructions to obtain traffic types comprise instructions to use packet inspection to determine a traffic type for each one of the plurality of traffic flows.

17. A non-transitory computer-readable medium storing a computer program for determining a set of power state parameters at least partly defining when a wireless terminal is to be in an active state or a power saving state, the computer program comprising computer program code which, when run on a network device, causes the network device to:
- obtain traffic types for each one of a plurality of traffic flows to or from a wireless terminal, resulting in a present combination of traffic types selected from a group consisting of voice over Internet Protocol, video conference, video streaming, audio streaming, web browsing, peer-to-peer traffic, media downloads and software downloads;
- find, in a power state parameter repository, a first match between the present combination of traffic types and a combination of traffic types associated with a first set of power state parameters, the power state repository comprising different sets of power state parameters, including the first set, where the different sets correspond to different combinations of traffic types;
- when the first match is found, transmit the first set of power state parameters to the wireless terminal;
- when no first match is found, read a configuration associated with the wireless terminal, the configuration specifying a prioritized single traffic type;
- when no first match is found, find, in the power state parameter repository, a second match between the prioritized single traffic type and a single traffic type associated with a second set of power state parameters; and
- when the second match is found, transmit the second set of power state parameters to the wireless terminal.

* * * * *